United States Patent [19]

Barnes et al.

[11] 4,456,493

[45] Jun. 26, 1984

[54] LOW VULNERABILITY GUN PROPELLANT

[75] Inventors: Michael W. Barnes, Brigham; Clifford E. Kristofferson, North Ogden, both of Utah; Anthony P. Manzara, Stillwater, Minn.

[73] Assignee: Thiokol Corporation, Chicago, Ill.

[21] Appl. No.: 484,001

[22] Filed: Apr. 11, 1983

[51] Int. Cl.³ .............................................. C06B 45/10
[52] U.S. Cl. ..................................... 149/19.4; 149/92; 149/111; 560/157
[58] Field of Search .......................... 149/19.4, 92, 111; 560/157

[56] References Cited

U.S. PATENT DOCUMENTS 4,288,640  9/1981  Schuster et al. ............... 568/807 X Primary Examiner—Stephen J. Lechert, Jr.
Attorney, Agent, or Firm—Gerald K. White; George F. Wheeler

[57] ABSTRACT

A prepolymer for use in preparing a binder for low vulnerability gun propellants. The condensation of an alkynediol and formaldehyde produces a prepolymer which is cured with a polyisocyanate. The resulting binder can be combined with 1,3,5,7-tetramethylenetetranitramine (HMX) or 1,3,5-trimethylenetrinitramine (RDX), and is readily extruded as multi-perforated propellant grains, the extruded material having a greatly reduced tendency to slumping, and an enhanced mass impetus value.

12 Claims, No Drawings

LOW VULNERABILITY GUN PROPELLANT

The invention described herein may be manufactured, used and licensed by or for the Government for governmental purposes without the payment of any royalty thereon, and was made in the course of or under a contract with the U.S. Department of the Army.

BACKGROUND OF THE INVENTION

1. Field of the Invention

The present invention relates to ammunition, and more particularly to low vulnerability gun propellants and novel polymers for use therein.

2. Description of the Prior Art

A continuing objective in the design of gun propellants is to provide a gun propellant which is energetic when deliberately ignited, but which exhibits high resistance to accidental ignition from heat, flame, impact, friction, and chemical action. Propellants possessing such resistance to accidental ignition are known as "low vulnerability" (often abbreviated as LOVA) gun propellants.

LOVA gun propellants are well-known in the prior art. One approach for producing low vulnerability gun propellants has been the use of polyurethane binders. For example, U.S. Pat. No. 4,091,729, to Bell et al, describes a main propellant charge which includes 25% by weight of 1,3,5,7-tetramethylenetetranitramine (HMX) or 1,3,5-trimethylenetrinitramine (RDX), in combination with 75% by weight of polyurethane binder. The polyurethane binder comprises 11.867% by weight of a hydroxyl-terminated block copolymer of propylene oxide and ethylene oxide, 3.167% by weight of trimethylol propane, 9.967% by weight of lysine diisocyanate methyl ester, and 0.025% by weight of titanyl acetyl acetonate. After mixing, the propellant is extruded and placed in a curing oven in the form of small diameter tubes.

However, the propellants of the prior art suffer from the disadvantages that they are not readily extruded with multiple perforations, and their mass impetus is only about 336,000 ft-lbf/lbm. While the mass impetus of such a prior art propellant is acceptable, a higher mass impetus is desirable. In addition, when extruded, a polyurethane such as that described in U.S. Pat. No. 4,091,729 can slump prior to cooling resulting in the partial closure of any perforations. "Slumping" is the tendency of an extruded material to flatten out rather than retaining its shape when placed on a flat surface while cooling and solidifying. Thus if the propellant as extruded is round in cross section, the material will tend to flatten out against the supporting surface.

Accordingly, a need exists for a polymer useful in making a low vulnerability gun propellant which exhibits a desirably high mass impetus value and lends itself to the extrusion of multi-perforated propellant grains which will retain their extruded shape without slumping.

SUMMARY OF THE INVENTION

In one embodiment, the present invention includes a polyisocyanate curable prepolymer comprising a polyalkynediol formal having a number average molecular weight greater than 1000.

In another embodiment, the present invention includes a low vulnerability gun propellant binder comprising the reaction product of an alkynediol formal prepolymer having a number average molecular weight of greater than 1000 and a polyisocyanate curing agent.

In yet another embodiment, the present invention includes a low vulnerability gun propellant comprising 75–85% by weight of particles of 1,3,5-trimethylenetrinitramine or 1,3,5,7-tetramethylenetetrahitramine, and 15–25% by weight of the binder which comprises another embodiment of the present invention.

In still another embodiment, the present invention includes a method of preparing the polyisocyanate curable prepolymer of the present invention comprising (a) reacting substantially equimolar amounts of formaldehyde and alkynediol while removing produced water until the reaction is substantially complete, (b) adding to the product of step (a) an additional between about 5 and about 20% by weight of formaldehyde or a formaldehyde source based upon the weight of formaldehyde initially reacted, and (c) reacting the additional formaldehyde while removing additionally produced water until the reaction is substantially complete.

The carbon-carbon triple bonds of the binder of the present invention provide additional energy when the propellant is ignited, yet are relatively inert and therefore do not appreciably affect the desirable low vulnerability of the LOVA gun propellant of the present invention.

DETAILED DESCRIPTION OF THE INVENTION

The polyurethane binder of the present invention is based upon a novel prepolymer prepared by the acid-catalyzed condensation of an alkynediol and formaldehyde.

Typical alkynediols which may be used in the present invention include 2-pentyne-1,5-diol, 3-hexyne-1,6-diol, 4-octyne-1,8-diol, and 5-decyne-1,10-diol. A preferred alkynediol for use in the present invention is 2-butyne-1,4-diol.

The formaldehyde may be added to the prepolymer reaction mixture in any suitable manner well-known to those skilled in the art. However, it is preferred for ease of manufacture that the formaldehyde be generated in situ from a formaldehyde source such as paraformaldehyde or symtrioxane due to the presence of the acid catalyst.

Any of the acid catalysts well-known in the prior art for use in such condensation reactions can be used in the practice of the present invention. The preferred acid catalyst is p-toluene sulfonic acid. Other suitable catalysts include sulfuric acid, hydrochloric acid, hydrofluoric acid, m-benzene disulfonic acid, zinc chloride, ferric chloride, and boron trifluoride. The acid catalyst is used in an effective catalytic amount, typically from about 0.01 to about 1.0 wt.% based on the weight of formaldehyde, or formaldehyde source, e.g., paraformaldehyde, or symtrioxane.

Suitable solvents for the use in preparing the prepolymer are well-known to those skilled in the art, such as benzene or toluene. However, the reaction may also be conducted in other similar substantially inert solvents.

As stated above, a particularly preferred combination of components for forming the prepolymer is 2-butyne-1,4-diol and formaldehyde. While a prepolymer containing carbon-carbon triple bonds is known in the prior art for use in rocket propellants, the prior art prepolymer is deficient in at least two respects. The prepolymer of the prior art has a low molecular weight (approximately 1000). In addition, the prior art prepolymer has a functionality of 2.0, thus requiring the use of a cross-linker such as trimethylol propane or DESMODUR N-100 (trademark of Farbenfabriken Bayer AG for a triisocyanate for use in forming urethanes) which complicates its processing.

The present invention overcomes these deficiencies by providing a synthetic procedure for the preparation of prepolymer of a higher molecular weight and functionality than the prior art, thus avoiding the need for a cross-linking agent in the production of the prepolymer. The prepolymer of the present invention has a number average molecular weight greater than 1000, and preferably greater than about 1250. Furthermore, it has a functionality greater than 2.0.

The higher molecular weight and functionality are obtained by initially reacting the alkynediol and formaldehyde in approximately equimolar amounts, and then after the reaction is substantially complete, adding an additional 5-20 wt. % of formaldehyde compared to the amount of formaldehyde initially added and allowing the reaction to continue for an additional period of time. The resulting prepolymer has a desirably higher molecular weight and functionality than the prior art prepolymer.

The preferred procedure for producing the prepolymer of the present invention consists of charging a suitable reaction container with the alkynediol, paraformaldehyde or symtrioxane, a suitable acid catalyst, and a suitable solvent. The mixture is stirred at reflux for several hours while continually removing the water produced by the condensation reaction. Additional paraformaldehyde or symtrioxane and acid catalyst are added as the reaction proceeds while continuing to remove water produced by the condensation. After cooling, the solvent is decanted, and the polymer is melted. Water is then added and the mixture is stirred vigorously. Finally, stirring is stopped, the water decanted, and a suitable azeotropic solvent is added for use in the removal of any remaining water by azeotropic distillation.

The resulting prepolymer may be cured with any suitable polyisocyanate well known to those skilled in the art. Representative polyisocyanates which may be used in the practice of the present invention include dimethylene diisocyanate, propylene-1,2-diisocyanate, tetramethylene diisocyanate, pentamethylene diisocyanate, octamethylene diisocyanate, benzene-1,3,5-triisocyanate, benzene-1,2,4-triisocyanate, toluene-2,3,4-triisocyanate, and toluene-2,4,6-triisocyanate. A preferred diisocyanate compound is hexamethylene diisocyanate.

The amount of polyisocyanate used depends on the desired hardness of the cured binder. The amount of polyisocyanate used is based upon the equivalents of isocyanate (NCO) to hydroxyl (OH). The ratio of NCO/OH is typically between about 0.85:1 and about 1.3:1. The greater the amount of NCO, the harder the cured binder. Preferably the ratio is about 1:1.

If desired, cross-linking agents well known in the art, such as trimethylol propane, can also be added in an effective amount, typically at between about 0.02 and about 1.0% by weight based on the weight of prepolymer, to increase cross-linking.

To prepare a gun propellant according to the present invention, the prepolymer, a polyisocyanate, between about 75 and about 85% by weight of 1,3,5,7-tetramethylenetetranitramine (HMX) or 1,3,5-trimethylenetrinitramine (RDX), and a cross-linking agent, if used, are combined and mixed in any order in a suitable heated mixing apparatus used for forming propellants, at a temperature of between about 140° and about 160° F.

The crystals of HMX or RDX preferably have a weight mean diameter of about two microns. One means for producing such a particle size is fluid energy milling. A two micron weight mean diameter results in a burning rate exponent of 0.98 instead of the greater than one values obtained when using larger particle sizes. However, the binder of the present invention can be used with larger particle sizes if desired.

The mixture is then extruded with multiple perforations in any of several commercially available extruders at a temperature between about 140 and about 160° F. and a pressure of about 700-1000 psi. Almost immediately after extrusion the gun propellant cools and solidifies with very little slumping to produce a LOVA gun propellant having a mass impetus of at least about 350,000 ft-lbf/lbm.

In order to further illustrate the present invention and the advantages thereof, the following specific examples are given, it being understood that these examples are intended only to be illustrative without serving as a limitation on the scope of the present invention.

EXAMPLE 1

A 22 liter three-necked flask, equipped with a mechanical stirrer, two Dean-Stark traps with condensers, and a heating mantle, is charged with technical grade butyne-1,4-diol (4300 g), paraformaldehyde (1500 g), p-toluene sulfonic acid (50 g) and toluene (15 l). The mixture is stirred at reflux for four hours, during which time water (about 900 ml) is removed.

Paraformaldehyde (150 g) and p-toluene sulfonic acid (5 g) are added and refluxing is continued for three hours, during which time water (100 ml) is removed. After cooling, the solvent is decanted from the polymeric precipitate. The polymer is melted and hot water (5.5 l) is added. The mixture is stirred vigorously for ¼ hour, then allowed to settle and the water decanted. This washing is repeated twice.

Benzene (6 ) is added and the water removed by azeotropic distillation. The benzene is then distilled off and the last traces of solvents are removed under vacuum. The polymer analyzes at 0.16 equivalents OH/100 g, $\overline{M}_n = 1260$. The melting point range is 55°-60° C., and the color is pale brown.

The prepolymer of Example 1, when cured with hexamethylene diisocyanate at an NCO/OH ratio of about 1:1, results in the elemental composition and heat of combustion values given in Table I. The heat of combustion value can be used to calculate the heat of formation value shown in Table I.

TABLE I

| Elemental Composition, % | C | H | N |
|---|---|---|---|
| | 59.79 | 6.305 | 2.097 |
| Empirical Formula (100 g mole) | $C_{4.983}H_{6.305}N_{0.1498}O_{1.988}$ | | |
| Experimental Heat of Combustion = 6.44 kcal/g. | | | |
| Heat of Formation = −40.0 kcal/mole | | | |

The above heat of formation value can be used in making performance calculations for various percentages by weight of HMX and the above binder. In Table II the HMX varies between 75% by weight and 85% by weight and the binder varies between 15% by weight and 25% by weight. As can be seen from Table II, the mass impetus values are considerably higher than those of the prior art.

TABLE II

| Composition (Percent By Weight) | | Mass Impetus |
|---|---|---|
| Binder | HMX | (ft-lbf/lbm) |
| 25 | 75 | 370,423 |
| 22.5 | 77.5 | 385,310 |
| 20 | 80 | 398,822 |
| 17.5 | 82.5 | 411,203 |
| 15 | 85 | 422,449 |

EXAMPLE 2

To prepare a gun propellant of the present invention, 22 grams of the prepolymer of Example 1 is added to 75 grams of crystalline HMX having a two micron weight mean diameter, and 3 grams of hexamethylene diisocyanate (an NCO/OH equivalents ratio of about 1:1). The mix is heated to about 140° F. and mixed thoroughly in a Baker-Perkins Upright Mixer.

The mixed composition is charged into an extruder heated at about 140° C., and approximately 700 psi of pressure is employed to extrude and cut the propellant into a seven perforation, cured grain having a diameter of 0.224 inch and a length of 0.625 inch.

Almost immediately after extrusion, the solid propellant cools and solidifies with very little slumping. Impulse bomb experiments on the resulting propellant provide the propellant performance values shown in Table III.

TABLE III

| Mass (gm) | Pressure (psig) | Time (msec) | $r_b$ (in/sec) |
|---|---|---|---|
| 2.400 | 1,690 | 71 | .317 |
| 2.580 | 1,840 | 65 | .346 |
| 5.150 | 3,960 | 32 | .703 |
| 10.200 | 9,150 | 15 | 1.500 |
| 10.550 | 9,600 | 14 | 1.607 |
| 12.950 | 12,500 | 11 | 2.044 |
| 12.930 | 12,500 | 11 | 2.046 |
| 14.650 | 15,000 | 7 | 3.214 |
| 14.630 | 15,400 | 8 | 3.813 |

Mass Impetus: 365,940 ft-lbf/lbm
Isochoric Flame Temperature: 2,626° K. (at 5,000 psia)
Linear Burning Rate Equation: $r_b = 1.731 \, ((P/10,000)$
Burning Rate Exponent = 0.982
Burning Rate = 1.731 in/sec.
Cut, 7 perforated grains: diameter = 0.224 in; length = 0.625 in.

From the above calculations and test results it can be seen that the gun propellants and binders of the present invention have performance values which are significantly higher than the low vulnerability gun propellants of the prior art and at least equivalent to conventional double base (nitroglycerin/nitrocellulose) gun propellants.

While the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A low vulnerability gun propellant binder comprising the reaction product of an alkynediol formal prepolymer having a number average molecular weight of greater than 1000, and a polyisocyanate.

2. The binder of claim 1 wherein the prepolymer is formed from an alkynediol comprising 2-butyne-1,4-diol, 2-pentyne-1,5-diol, 3-hexyne-1,6-diol, 4-octyne-1,8-diol, or 5-decyne-1,10-diol.

3. The binder of claim 1 wherein the polyisocyanate curing agent comprises hexamethylene diisocyanate, pentamethylene diisocyanate, tetramethylene diisocyanate, propylene diisocyanate, dimethylene diisocyanate, benzene-1,3,5,-triisocyanate, benzene-1,2,4-triisocyanate, toluene-2,4,6-triisocyanate, or toluene-2,3,4-triisocyanate.

4. The binder of claim 1 wherein the alkynediol formal prepolymer is poly-2-butyne-1,4-diol formal and the curing agent is hexamethylene diisocyanate.

5. The binder of claim 1 wherein the ratio of NCO equivalents of the polyisocyanate to the OH equivalents of the prepolymer is between about 0.85:1 and about 1.3:1.

6. The binder of claim 5 wherein the NCO/OH equivalents ratio is about 1:1.

7. The binder of claim 1, further including a crosslinking agent.

8. The binder of claim 1 wherein the molecular weight of the prepolymer is greater than about 1250.

9. A low vulnerability gun propellant comprising
   a. 75–85% by weight of particles of 1,3,5-trimethylenetrinitramine or 1,3,5,7-tetramethylenetetranitramine; and
   b. 15 to 25% by weight of the binder of claim 1.

10. The propellant of claim 9 wherein the binder is the reaction product of poly-2-butyne-1,4-diol formal and hexamethylene diisocyanate.

11. The propellant of claim 9 wherein the particles of 1,3,5-trimethylenetrinitramine or 1,3,5,7-tetramethylenetetranitramine have a weight mean diameter of about two microns.

12. The propellant of claim 9 having a mass impetus of at least about 350,000 ft-lbf/lbm.

* * * * *

UNITED STATES PATENT AND TRADEMARK OFFICE
CERTIFICATE OF CORRECTION

PATENT NO. : 4,456,493

DATED : June 26, 1984

INVENTOR(S) : Michael W. Barnes et al

It is certified that error appears in the above—identified patent and that said Letters Patent is hereby corrected as shown below:

Column 4, line 44, "Benzene (6)" should read --Benzene (61)--.

Column 5, line 45, "$r_b=1.731((P/10,000)$" should read --$r_b=1.731(P/10,000)^{0.982}$--.

Signed and Sealed this

Twenty-third Day of July 1985

[SEAL]

Attest:

DONALD J. QUIGG

Attesting Officer

Acting Commissioner of Patents and Trademarks